Patented Aug. 23, 1932

1,873,936

UNITED STATES PATENT OFFICE

WILHELM LOMMEL, OF WIESDORF-ON-THE-RHINE, THEODOR GOOST, OF LEVERKUSEN-ON-THE-RHINE, AND HERMANN FRIEDRICH, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY

ACCELERATOR FOR VULCANIZATION PURPOSES

No Drawing. Application filed September 5, 1930, Serial No. 480,020, and in Germany November 8, 1927.

The present invention relates to a process of vulcanizing rubber compounds and consists in effecting the vulcanization in the presence of a salt of a dithiocarbamic acid of the probable formula:

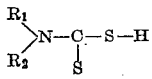

wherein $R_1$ means the cyclohexyl group or a homologue thereof, $R_2$ stands for a hydrocarbon radical which may be linked up with $R_1$ to form a ring configuration. The invention furthermore relates to the vulcanized rubber compounds obtainable by the process above identified.

In accordance with the invention a compound of the above formula is incorporated, for example, by rolling or kneading within the rubber compounds to be vulcanized together with or apart from the other ingredients usually employed in vulcanization processes, such as sulfur, selenium, aromatic nitro compounds+metal oxides or other vulcanizing agents, fillers, plasticizing agents, pigments, etc. Vulcanization of the mixtures thus produced is performed by heating with or without the application of superatmospheric pressure, advantageously to temperatures between about 100–150° C.

It may be mentioned that the term "rubber compound" is intended to include natural rubber varieties and artificial rubber like masses obtainable by polymerizing a rubber forming hydrocarbon, such as butadiene-(1.3) or homologues or analogues thereof alone or in admixture with other suitable compounds capable of being polymerized, such as styrol, vinylnaphthalenes, etc. Obviously, instead of a single one of our vulcanization accelerators, mixtures of two or more of the same may be employed and, if desired, accelerators of another type may be used simultaneously.

The preparation of our vulcanization accelerators may be performed, for example, according to the methods described in the German Patents 459,628, 497,241 or 498,280. As salts of dithiocarbamic acids there may be mentioned those with primary, secondary or tertiary organic bases of the most various kind, the ammonium salts and those with monovalent or divalent metals, such as sodium, potassium, barium, magnesium, zinc and the like.

This application is a continuation in part of our co-pending application Serial No. 240,331, filed December 15, 1927.

The following examples will illustrate the invention without restricting it thereto, the parts being by weight.

Example 1

100 parts of smoked sheets
10 parts of zinc white
2.5 parts of sulfur
0.5 part of the ethylcyclohexylamine salt of ethylcyclohexyldithiocarbamic acid of the formula

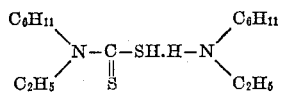

are mixed by rolling or kneading and the mixture is vulcanized at 130° C. for 20 minutes. A vulcanizate is thus obtained showing a tensile strength of about 160 kg/sqcm at a stretch of about 690%.

Example 2

100 parts of smoked sheets
10 parts of zinc white
6 parts of sulfur
1 part of the ethyl-hexahydro-para-toluidine salt of ethyl-hexahydro-para-tolyl-dithiocarbamic acid of the formula:

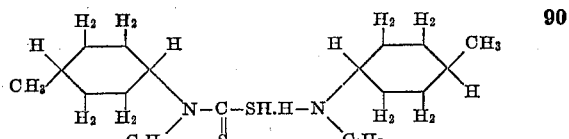

are mixed by rolling or kneading and the mixture is vulcanized at 120° C. for 30 minutes. A vulcanizate is thus obtained showing a tensile strength of about 166 kg/sqcm at a stretch of about 680%.

Example 3

100 parts of smoked sheets
10 parts of zinc white
2 parts of sulfur
1 part of the cyclohexylamine salt of ethyl-cyclohexyl-dithiocarbamic acid of the formula:

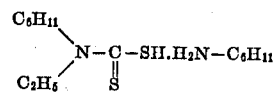

are mixed by rolling or kneading and the mixture is vulcanized at 105° C. for 30 minutes. A vulcanizate is thus obtained showing a tensile strength of about 192 kg/sqcm.

Example 4

100 parts of smoked sheets
5 parts of zinc white
2.5 parts of sulfur
0.6 part of the dekahydroquinaldine salt of ethylcyclohexyl-dithiocarbamic acid of the formula:

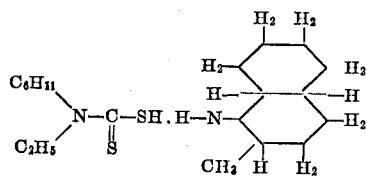

are mixed by rolling or kneading and the mixture is vulcanized at about 105° C. for 20 minutes. A vulcanizate is thus obtained showing a tensile strength of 183 kg/sqcm at a stretch of about 806%.

Example 5

100 parts of a butadiene-sodium polymerizate
60 parts of carbon black
25 parts of zinc white
2 parts of stearic acid
2 parts of tar
2 parts of colophony
1 part of sulfur
1 part of the dekahydroquinaldine salt of dekahydroquinaldine - dithiocarbamic acid of the formula

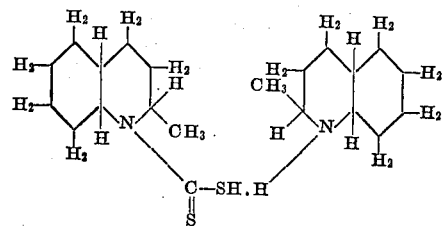

are mixed by rolling or kneading and the mixture is vulcanized at about 140° C. for 40 minutes. A vulcanizate is thus obtained showing a tensile strength of 183 kg/sqcm at a stretch of about 740%.

Example 6

100 parts of a butadiene-sodium polymerizate
60 parts of carbon black
15 parts of zinc white
2 parts of stearic acid
2 parts of colophony
2 parts of tar
1 part of sulfur
0.67 part of the cyclohexylbenzylamine salt of cyclohexyl-benzyl-dithiocarbamic acid of the formula:

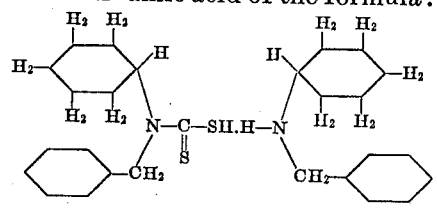

are mixed by rolling or kneading and the mixture is vulcanized at about 140° C. for 40 minutes. A vulcanizate is thus obtained showing a tensile strength of 160 kg/sqcm at a stretch of 650%.

Example 7

100 parts of smoked sheets
5 parts of zinc oxide
2.5 parts of sulfur
0.5 part of the ethylcyclohexylamine salt of cyclohexylethyl-dithiocarbamic acid of the formula:

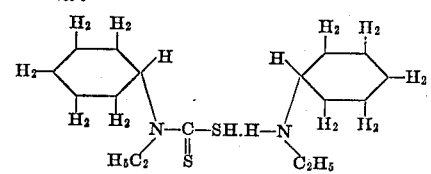

are mixed by rolling or kneading and the mixture is vulcanized at about 105° C. for 30 minutes. A vulcanizate is thus obtained showing a tensile strength of about 252 kg/sqcm at a stretch of 785%.

Example 8

100 parts of smoked sheets
1 part of paraffin oil
1.5 parts of stearic acid
3 parts of activated zinc oxide
2.5 parts of surfur
0.5 part of the zinc salt of dekahydroquinaldine-dithiocarbamic acid of the formula:

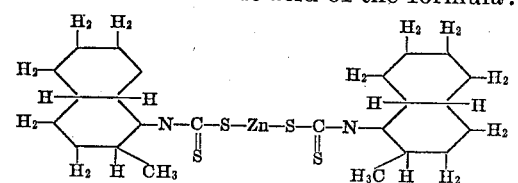

are mixed by rolling or kneading and the mixture is vulcanized at about 105° C. for 50 minutes. A vulcanizate is thus obtained showing a tensile strength of about 198 kg/sqcm.

Similar results will be obtained by replacing the accelerators employed in the above examples, for example by:

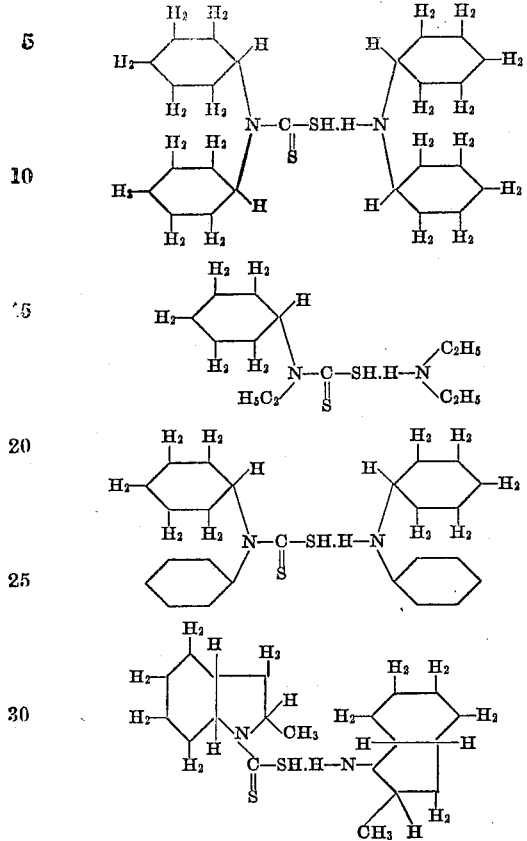

It may be mentioned that a great part of the accelerators used in the present application may also be employed by dissolving them in a suitable organic solvent, such as benzene or the like, dipping the rubber compound to be vulcanized into the solution and heating it to a suitable temperature after having removed it from the solution.

We claim:—

1. Process for the manufacture of vulcanized rubber compounds which consists in effecting the vulcanization in the presence of a salt of a compound of the probable formula:

wherein $R_1$ stands for the cyclohexyl group or a homologue thereof and $R_2$ stands for a hydrocarbon radical which may be linked up with $R_1$ to form a ring configuration.

2. Process for the manufacture of vulcanized rubber compounds which consists in effecting the vulcanization in the presence of a salt of a compound of the probable formula:

wherein $R_1$ stands for the cyclohexyl group or a homologue thereof and $R_2$ stands for an alkyl group which may be linked up with $R_1$ to form a ring configuration.

3. Process for the manufacture of vulcanized rubber compounds which consists in effecting the vulcanization in the presence of a compound of the probable formula:

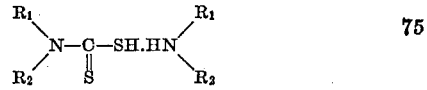

wherein $R_1$ means a cyclohexyl group or a homologue thereof, $R_2$ means a hydrocarbon radical which may be linked up with $R_1$ to form a ring configuration.

4. Process for the manufacture of vulcanized rubber compounds which consists in effecting the vulcanization in the presence of a compound of the probable formula:

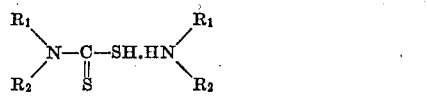

wherein $R_1$ means a cyclohexyl group or a homologue thereof, $R_2$ means an alkyl group which may be linked up with $R_1$ to form a ring configuration.

5. Process for the manufacture of vulcanized rubber compounds which consists in effecting the vulcanization in the presence of a compound of the probable formula:

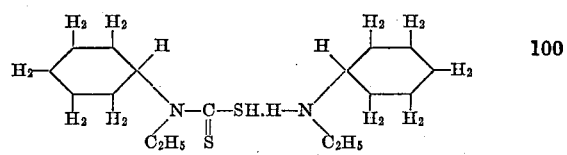

6. Process for the manufacture of vulcanized rubber compounds which consists in effecting the vulcanization in the presence of a compound of the probable formula:

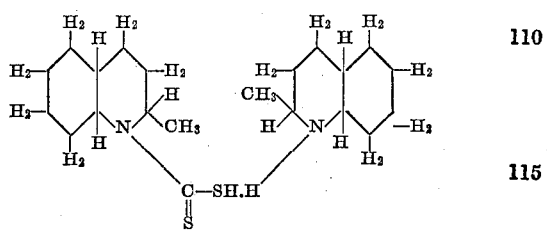

7. As new products of manufacture vulcanized rubber compounds obtainable according to claim 1.

8. As new products of manufacture vulcanized rubber compounds obtainable according to claim 2.

9. As new products of manufacture vulcanized rubber compounds obtainable according to claim 3.

10. As new products of manufacture vulcanized rubber compounds obtainable according to claim 4.

11. As new products of manufacture vulcanized rubber compounds obtainable according to claim 5.

12. As new products of manufacture vulcanized rubber compounds obtainable according to claim 6.

In testimony whereof, we affix our signatures.

WILHELM LOMMEL.
THEODOR GOOST.
HERMANN FRIEDRICH.

Certificate of Correction

Patent No. 1,873,936. August 23, 1932.

WILHELM LOMMEL ET AL.

It is hereby certified that error appears in the printed specification of the above-numbered patent requiring correction as follows: Page 2, lines 26 to 32, inclusive, strike out the formula and insert instead—

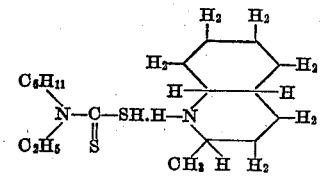

same page, lines 119 to 125, strike out the formula and insert instead—

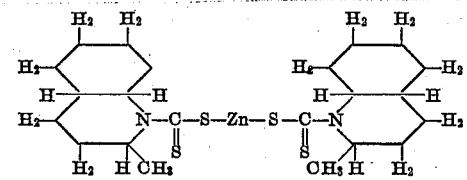

page 3, lines 27 to 34, strike out the right-hand portion of the formula and insert instead—

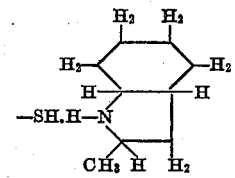

and that the said Letters Patent should be read with these corrections therein that the same may conform to the record of the case in the Patent Office.

Signed and sealed this 14th day of February, A. D. 1933.

[SEAL.]

M. J. MOORE,
Acting Commissioner of Patents.